ULTRA HIGH FREQUENCY COMMUNICATION SYSTEM

Filed May 20, 1943 3 Sheets-Sheet 1

INVENTOR
DE WITT R. GODDARD.
KENNETH G. MAC LEAN.
BY H. S. Grover
ATTORNEY

ULTRA HIGH FREQUENCY COMMUNICATION SYSTEM

Filed May 20, 1943

3 Sheets-Sheet 2

INVENTOR
DE WITT R. GODDARD
KENNETH G. MACLEAN
BY H. S. Grover
ATTORNEY

July 18, 1950 DE WITT R. GODDARD ET AL 2,515,213

ULTRA HIGH FREQUENCY COMMUNICATION SYSTEM

Filed May 20, 1943 3 Sheets-Sheet 3

INVENTOR
DE WITT R. GODDARD.
KENNETH G. MACLEAN.
BY
H. S. Grover
ATTORNEY

Patented July 18, 1950 2,515,213

UNITED STATES PATENT OFFICE 2,515,213

ULTRA HIGH FREQUENCY COMMUNICATION SYSTEM

De Witt R. Goddard and Kenneth G. MacLean, Riverhead, N. Y., assignors to Radio Corporation of America, a corporation of Delaware Application May 20, 1943, Serial No. 487,722

19 Claims. (Cl. 250—13)

This invention relates to an ultra high frequency system, and particularly to a communication system of the type employing a cavity resonator tuned circuit.

One object of the invention is to provide an ultra high frequency system having a plurality of circuits for use with a common cavity resonator under different conditions of operation, together with means for automatically compensating for variations in frequency of the cavity resonator under these different conditions.

Another object is to provide an ultra high frequency transceiver having automatic means for compensating for frequency shift of a common tuned circuit when changing from the receiving condition to the transmitting condition.

Among the features of the invention are: The solenoid arrangement and associated elements for automatically compensating for changes in frequency of the cavity resonator under different conditions of operation; the ultra high frequency oscillator system employing the cavity resonator and the feed-back loop in the cathode circuit for enhancing cavity oscillations; and the channel selection system.

Figure 1:
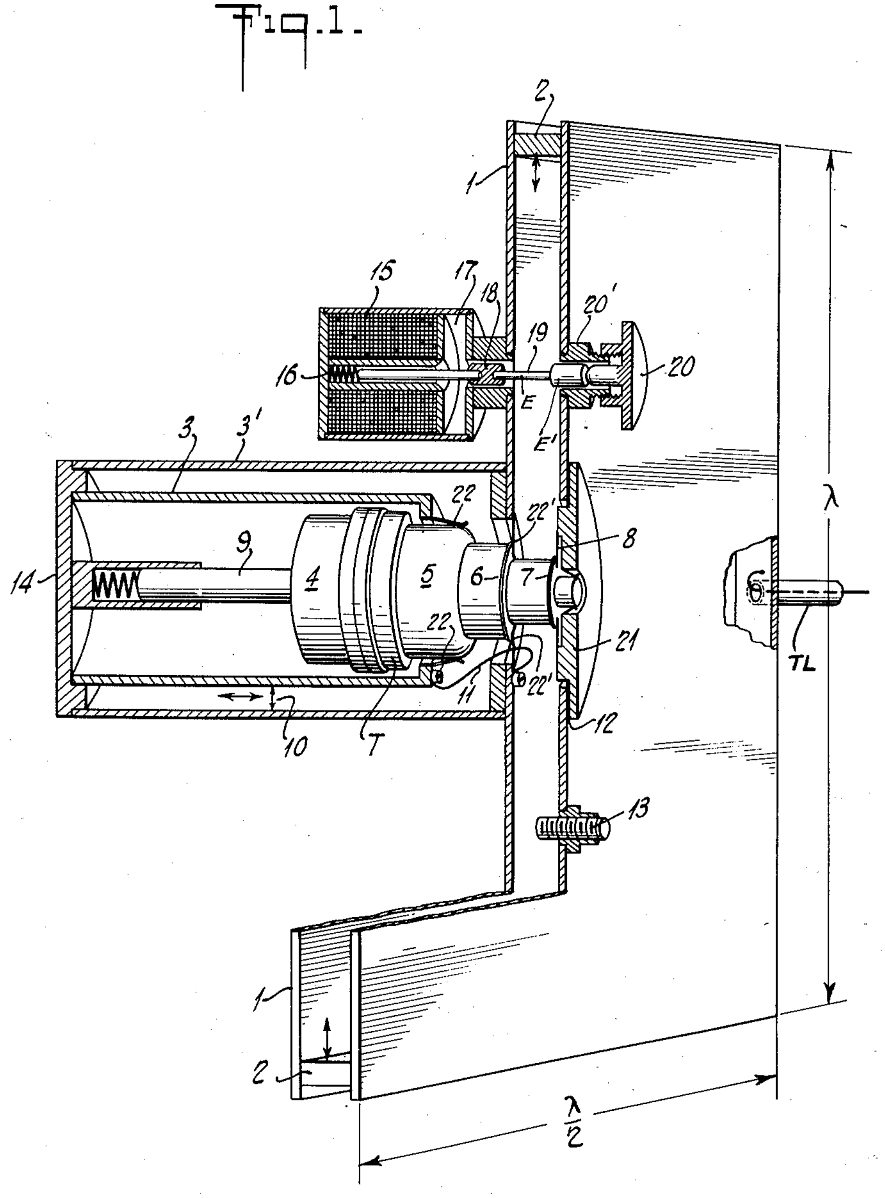
Figure 2:
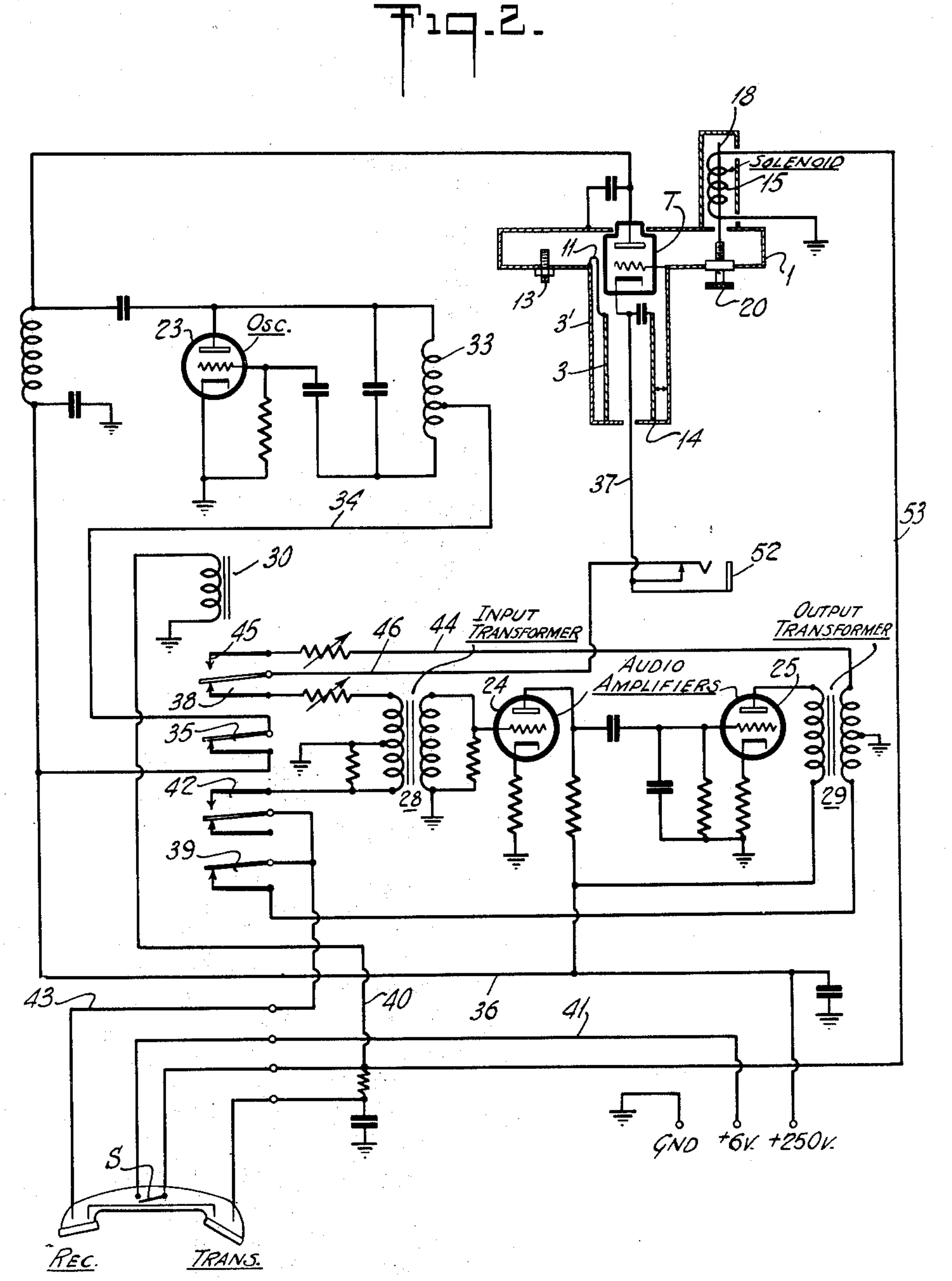
Figure 3A:
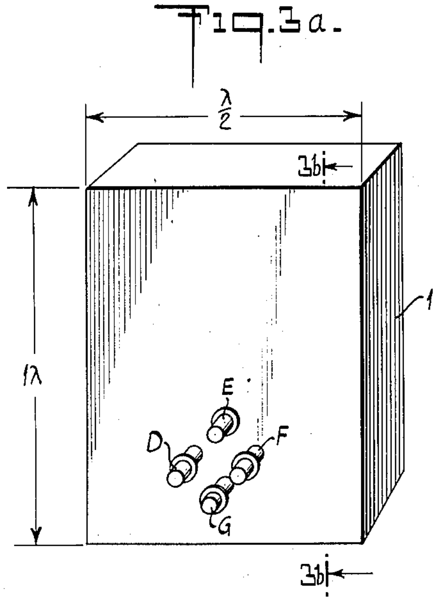
Figure 3B:
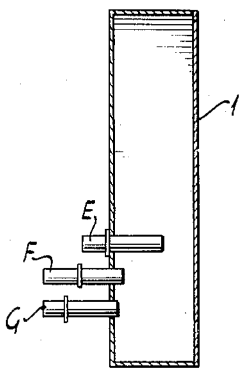
Figure 4A:
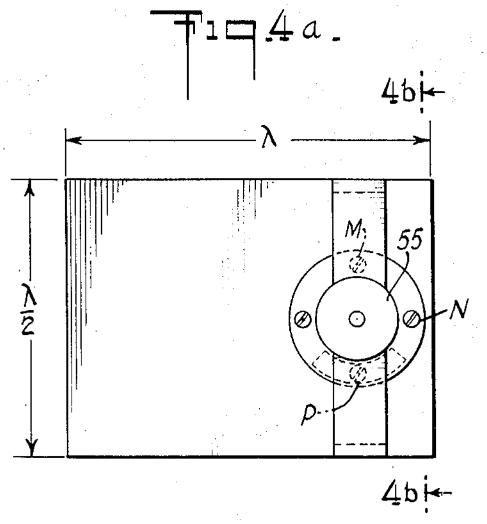
Figure 4B:
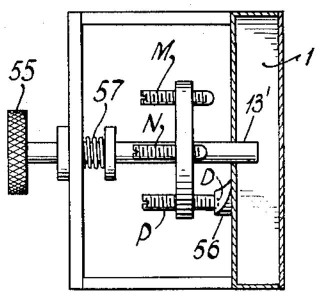

A more detailed description of the invention follows, in conjunction with a drawing wherein:

Fig. 1 illustrates, partly perspective and partly in section, the mechanical details of an ultra high frequency oscillator and cavity resonator system employing the essential features of the present invention;

Fig. 2 schematically illustrates an ultra high frequency transceiver circuit in which the apparatus of Fig. 1 can be used;

Figs. 3*a* and 3*b* diagrammatically illustrate different views of a channel selective system which can be used with the cavity resonator of Fig. 1; and Figs. 4*a* and 4*b* illustrate, diagrammatically only, different views of another type of channel selective system which can be used with the cavity resonator of Fig. 1.

The system of Fig. 1 shows the mechanical details of the ultra high frequency oscillator circuit employing the vacuum tube T and the associated cavity resonator 1. The oscillator vacuum tube is of the "light house" or so-called disc-seal type, wherein the grid and anode connections protrude through the glass envelope in the form of metallic rings spaced from one another along the length of the tube. These metallic rings or discs connect with the cavity resonator 1 on opposite sides of the cavity, as shown. The grid ring is labeled 6 and makes contact with one wall of the cavity resonator through spring contacts 22′ while the anode ring 7 makes contact with the opposite wall of the cavity resonator by means of spring contacts 8. The cavity resonator is provided, at the wall which accommodates the anode ring 7, with an annular metallic plate 21 apertured at the center. Metallic plate 21 is capacitively coupled to the rest of the wall of the cavity resonator by means of mica spacers 12. The condenser formed between the annular ring 21, to which the anode ring is directly connected, and the adjacent wall of the cavity resonator is a low impedance path for energy of the operating frequency, and thus it will be seen that the anode of the lighthouse tube is by-passed to the cavity resonator for radio frequency energy. The oscillator tube T includes a metallic shell 5 and a tube socket 4. A suitable lighthouse tube of the type shown in the drawing, mentioned by way of example only, is the General Electric type GL–446 triode. The tube T is held in place by spring pressure on base 4 by means of a spring loaded rod 9 which forces the grid and plate rings 6 and 7, respectively, against their respective contact springs in the cavity resonator 1.

The grid-cathode circuit of the oscillator includes a tunable coaxial line having an inner hollow conductor 3 and an outer hollow conductor 3′, both conductors of which are connected together at one end by a metallic end plate 14. The inner conductor 3 of the coaxial line is large enough to accommodate in its interior the envelope of the tube T, as shown. This inner conductor may be either cylindrical or square, and is provided at its free end with springs 22 which contact the metal shell 5. The outer conductor 3′ is preferably of square configuration for practical reasons, although if desired it may be cylindrical in form. Tuning of the coaxial resonator is achieved by means of a sliding contact 10, which engages the inner surface of the outer conductor 3′ and the outer surface of the inner conductor 3 and is movable in an axial direction along the length of the coaxial line. A feed-back loop 11 extends into the interior of the cavity resonator 1 at a low impedance location where the electric coupling is a minimum and couples the cavity resonator to the free end of the inner conductor 3, in turn coupled to the metallic shell 5 of the tube T. This feed-back loop couples energy inductively from the cavity and conducts this energy to the cathode in such phase as to aid oscillations. Metallic shell 5 is capacitively coupled to the cathode circuit by means of a mica condenser built into the tube, and hence it will be obvious that the cathode circuit is coupled to the cavity resonator by means of the loop 11.

The output circuit is in the form of a loop within the interior of the cavity resonator, preferably entering the resonator in its narrow dimension side. This loop extends by way of a coaxial line TL to a suitable antenna.

The cavity resonator 1 is operated at one wavelength in its long dimension and one-half of a wavelength in another dimension, as indicated on the drawing. The frequency of the cavity resonator is fixed by means of adjustable metallic end blocks 2, 2, which are designed to be moved a desired amount in the direction of the arrows, as shown, for permitting inital setting of the cavity resonator frequency. In order to enable tuning of the cavity resonator over a range of, let us say +5% and −5%, there is provided a screw 13 which enters the interior of the cavity resonator. This screw is located at or near a point of high impedance for the cavity for most efficient use, and has the effect of controlling the frequency of the cavity resonator by varying the capacity across the cavity.

Inasmuch as the cavity resonator 1 is designed for use particularly in connection with a transceiver operating at ultra high frequencies and using a common oscillator tube T both as a transmitting oscillator and as a super-regenerative detector, means are provided for automatically compensating for a change in frequency of the cavity resonator 1 when the system is switched from a transmitting condition to a receiving condition. It has been found, in transceivers of the type in which the apparatus of Fig. 1 is to be used, that when the system is adjusted to receive a frequency of let us say 3000 megacycles, and then switched to the transmitting condition, the transmitter frequency changes and may be of the order of, let us say, 3002 megacycles. It will thus be seen that when there are a plurality of these transceivers suitably spaced and working with one another, these systems should be provided with some means for automatically retuning each transceiver when it is switched from the sending condition to the receiving condition; otherwise a pair of stations designed to operate on the same frequency would not be able to communicate with one another efficiently, if at all. The automatic means of the present invention for accomplishing compensation in the frequency shift caused by switching the system from a transmitting condition to a receiving condition, has the advantage of not altering the transmitting frequency when the receiver tuning is changed. Putting it in other words, the receiving frequency and the transmitting frequency are always made to be the same in the operation of the system.

The automatic frequency compensator in its essentials includes a solenoid 15 controlling a plug 19, by way of magnetic armature 18. Plug 19 is of low loss material, preferably a dielectric such as amphenol, or alternatively a metallic plug inserted in the cavity 1. This plug is so shaped that it has a narrow portion E which is rather slender and an end portion E′ which is larger in diameter. In the receiving position of the system, the spring 16 in the solenoid exerts pressure on the plug 19 to seat it (in the position shown in the drawing) against the tuning knob 20, the latter in turn threadedly engaging a sleeve 20′ having a central aperture for accommodating the end E′ of the plug 19. When the solenoid 15 is energized, which occurs during the transmitting condition of the system, the plug 19 will be pulled further into the cavity against the opposing force of the spring 16, such that the large end E′, which may be of solid material, enters further into the cavity in such a way as to lower the frequency of the resonator (the transmitting frequency) to exactly the frequency of the resonator when the system is in the receiving condition. The receiver may, of course, be tuned by pushing the plug 19 in and out of the resonator by means of the knob 20, but this will not affect the transmitting frequency which is always the same since the plug always seats a definite amount into the cavity when the system is in the transmitting condition.

In adjusting the system of Fig. 1 for operation to a particular frequency, the transmit button or switch of the system is operated (as will appear in greater detail later in the description of Fig. 2), as a result of which the solenoid 15 is energized and attracts the armature 18 against the action of spring 16, thus causing the large end E′ of rod 19 to enter the cavity. Screw 13 is then adjusted for the desired transmitting frequency of operation. The transmit button should now be released, allowing the plug 19 to return to its original position under pressure of spring 16, as a result of which the plug 19 will stop or rest on tuning knob 20. This tuning knob 20 may now be tuned to receive a remote transmitter. As a result of these operations, the plug 19 (in the transmitting condition of the system) will be pulled into the cavity, thus enabling the system to transmit at the same frequency for which it was previously adjusted. After an initial warming up period, it is no longer necessary to tune by means of knob 20, and the sending and receiving operations are made on the same frequency without further adjustment, with plug 19 automatically operating to make the transmitting and receiving frequencies identical.

A suitable transceiving system employing the apparatus of Fig. 1 is illustrated in Fig. 2. The system of Fig. 2 employs the ultra high frequency oscillator T, both as a transmitting oscillator and as part of the circuit of a super-regenerative detector. The same reference numerals employed in Fig. 1 have been used in Fig. 2 to identify the same parts. The cavity resonator tuner unit is labeled 1, the lighthouse tube is labeled T, the solenoid frequency compensator is labeled 18. A quench oscillator 23, which may be an RCA 9002 triode operating at 100 kilocycles, serves to plate modulate the ultra high frequency oscillator T at a 100 kilocycle rate for super-regenerative action. A relay 30 serves to condition the system for either receiving or transmitting under control of a switch S in the handset. Vacuum tubes 24 and 25 comprise two stages of audio frequency amplification having an input transformer 28 and an output transformer 29.

In the operation of the transceiver of Fig. 2, the system as shown in the drawing is in the receiving condition, in which case the contacts will be as indicated in the drawing and the relay 30 unenergized. In this receiving condition, the anode of the quench oscillator 23 receives its positive polarizing potential over a path including inductance coil 33, lead 34, contacts 35 of relay 30, and lead 36 extending to a positive 250 volt terminal of a source of supply. Signal energy received on the system is derived from the ultra high frequency oscillator tube T (now acting as a detector) by means of lead 37, which extends to contacts of jack 52, from which the incoming signal energy passes over contacts 38 of relay 30 and into the upper half of input transformer 28. The detected signal impressed on transformer 28 is amplified in stages 24 and 25 and then impressed on output transformer 29, from the lower half of the secondary of which the signal passes through contacts 39 of relay 30 and into the earphones of the handset. In the transmitting condition of the system, however, switch or button S in the handset is closed by the operator, as a result of which the relay 30 is energized over a path including lead 40, switch S, and lead 41. The operation of relay 30 will open contacts 35, 38 and 39 and close contacts 42, as a result of which the anode polarizing potential for the quench oscillator is removed from the tube 23, and the input transformer 28 connected by means of contacts 42 to the microphone of the hand set over a circuit including lead 43. The output transformer 29 will now be connected to the cathode of the ultra high frequency oscillator T over a path including lead 44, contact 45 of relay 30, lead 46, and the contacts of jack 52. It should be noted that in the transmit position of the transceiver the operation of switch or button S will close a circuit to operate solenoid 15 over a path including lead 41, switch S and lead 53. The operation of the solenoid 15, in turn, will attract the magnetic armature 18 in such direction as to pull the plug into the cavity resonator so as to lower the frequency of the cavity resonator automatically by an amount which will make the transmitting frequency identical with the receiving frequency.

Where it is desired to employ the transceiver of the invention for operation with a number of other similar units, on different channels having different frequencies, the systems of Figs. 3*a* and 3*b* or 4*a* and 4*b* may be used alternatively. Fig. 3*b* is a sectional view of the resonator 1 of Fig. 3*a*, along the line 3*b*—3*b*. Fig. 3*a* shows, in a diagrammatic manner only, how the resonator 1 can be employed in connection with a plurality of inserts D, E, F, G, similar to 13 of Figs. 1 and 2, for selecting predetermined frequency channels. These inserts of Fig. 3*a* and Fig. 3*b* can take the form of push buttons controlling inserts of different lengths. The inserts, like insert 13 of Figs. 1 and 2, should be located near a maximum impedance point in the cavity resonator for best results, and are suitably adjustable as to the amount of entrance into the cavity for accurately setting the channel frequency. They can be suitably interlocked in a manner well known in the art in connection with push button control, so that the operation of any one button (D, E, F, G) releases all other buttons. One suitable push button control arrangement known in the art and which can be followed in the practice of the present invention is described in Hammond United States Patent No. 2,052,708, given here by way of example only.

Figs. 4*a* and 4*b* illustrate different views of an alternative arrangement wherein only one insert 13′ is used in the cavity resonator but with adjustable stops M, N and P for permitting the insert 13′ to be set to different amounts corresponding to predetermined frequencies. Fig. 4*b* represents a view of Fig. 4*a* along the lines 4*b*—4*b*. Only a single knob 55 is required, which upon rotation enables the selection of any one of the adjustable stops M, N and P. Since these stops are of different lengths, their ends can be made to seat in the stop rest 56, and thus control the amount by which the insert 13′ projects into the cavity resonator. In the operation of the arrangement of Figs. 4*a* and 4*b*, the knob 55 is rotated, allowing the stop P to move out of the slight detent D on rest 56, and down the inclined side of 56. The next stop N then rides up the inclined side of 56 until it seats in the detent D. The spring 57 seats N firmly in detent D, thus positioning 13′ for the new frequency channel. Thus, by rotation of knob 55 any number of predetermined channels may be selected by pre-adjustment of the stops M, N, P etc. The unit illustrated is designed for four frequency channels.

What is claimed is:

1. In combination, an ultra high frequency oscillator having a cavity resonator as a frequency determining element, means for operating said oscillator either as a transmitter or as a detector of signals, and separate means under control of said first means for automatically changing the tuning of said cavity resonator by a predetermined amount when the function of said oscillator is changed.

2. In a transceiver, an ultra high frequency oscillator in common to both the transmitting and receiving paths, said oscillator having a cavity resonator as a frequency determining element, a switch for conditioning said transceiver to function either as a receiver or a transmitter, and means responsive to the operation of said switch for automatically changing the tuning of said cavity resonator by a predetermined amount.

3. In a transceiver, an ultra high frequency oscillator in common to both the transmitting and receiving paths, said oscillator having a cavity resonator as a frequency determining element, a switch for conditioning said transceiver to function either as a receiver or a transmitter, said oscillator operating as a transmitter at a predetermined frequency, and means responsive to the operation of said switch to a position which conditions said apparatus to receive signals for automatically changing the tuning of said resonator to thereby compensate for any tendency toward variation in frequency of said oscillator from said predetermined frequency.

4. In combination, a cavity resonator, a movable insert having portions of different diameters, said insert having one portion normally protruding into said cavity resonator, and a solenoid for controlling the movement of said insert into said cavity resonator, to thereby introduce another portion of different diameter into said cavity resonator for changing the tuning thereof.

5. An ultra high frequency oscillator comprising a vacuum tube having a cathode, a grid and an anode, a cavity resonator having oppositely disposed walls coupled to said grid and anode, and a feedback loop extending into said cavity resonator at a location where the electric coupling is a minimum and coupled to said cathode for enhancing cavity oscillations.

6. An ultra high frequency oscillator comprising a grid-controlled vacuum tube having a cathode and an anode, a cavity resonator coupled to said anode, another resonator coupled between said cathode and grid, and a feed back loop magnetically coupled to said cavity resonator and also coupled to said cathode at a location of low impedance where the electrostatic coupling is a minimum enhancing oscillations in said resonant circuit.

7. In a transceiver, an ultra high frequency oscillator in common to both the transmitting and receiving paths, said oscillator having a cavity resonator as a frequency determining element, a switch for conditioning said transceiver to function either as a receiver or a transmitter, said oscillator operating as a transmitter at a predetermined frequency, and means responsive to the operation of said switch to a position which conditions said apparatus to receive signals for automatically changing the tuning of said resonator to thereby compensate for any tendency toward variation in frequency of said oscillator from said predetermined frequency, said means including a movable insert for changing the resonant frequency of said resonator and a solenoid for moving said insert between two fixed positions.

8. In a transceiver, an ultra high frequency oscillator in common to both the transmitting and receiving paths, said oscillator having a cavity resonator as a frequency determining element, a switch for conditioning said transceiver to function either as a receiver or a transmitter, said oscillator operating as a transmitter at a predetermined frequency, and means responsive to the operation of said switch to a position which conditions said apparatus to receive signals for automatically changing the tuning of said resonator to thereby compensate for any tendency toward variation in frequency of said oscillator from said predetermined frequency, said means including a movable insert for changing the resonant frequency of said resonator and a solenoid for moving said insert between two fixed positions, said insert having one end portion narrower than its other end portion.

9. An ultra high frequency transceiver comprising a lighthouse type of vacuum tube oscillator operating to generate oscillations of the order of thousands of megacycles, said tube having physically spaced parallel grid and anode electrode terminals and a cathode, a cavity resonator having oppositely disposed substantially parallel walls, at least one of said walls having an aperture for enabling the anode terminal end of said vacuum tube to enter the interior of said resonator, means coupling one of said walls to said grid electrode terminal, means coupling the other of said walls to said anode electrode terminal, a coaxial line resonator located externally of said cavity resonator and coupled to the cathode and the grid terminal of said vacuum tube, a switch and circuit elements associated therewith for conditioning said vacuum tube oscillator to function either as a transmitter oscillator or as a super-regenerative detector, a movable insert for said cavity resonator for changing the resonant frequency of said cavity resonator, and a solenoid responsive to the operation of said switch for moving said insert between two predetermined positions.

10. An ultra high frequency transceiver comprising a lighthouse type of vacuum tube oscillator operating to generate oscillations of the order of thousands of megacycles, said tube having physically spaced parallel grid and anode electrode terminals and a cathode, a cavity resonator having oppositely disposed substantially parallel walls, at least one of said walls having an aperture for enabling the anode terminal end of said vacuum tube to enter the interior of said resonator, means coupling one of said walls to said grid electrode terminal, means coupling the other of said walls to said anode electrode terminal, a coaxial line resonator located externally of said cavity resonator and coupled to the cathode and the grid terminal of said vacuum tube, a switch and circuit elements associated therewith for conditioning said vacuum tube oscillator to function either as a transmitter oscillator or as a super-regenerative detector, a movable metallic insert for said cavity resonator supported between said same oppositely disposed walls of said cavity resonator for changing the resonant frequency of said cavity resonator, and a solenoid responsive to the operation of said switch for moving said insert between two predetermined positions.

11. An ultra high frequency transceiver comprising a lighthouse type of vacuum tube oscillator operating to generate oscillations of the order of thousands of megacycles, said tube having physically spaced parallel grid and anode electrode terminals and a cathode, a cavity resonator having oppositely disposed substantially parallel walls, at least one of said walls having an aperture for enabling the anode terminal end of said vacuum tube to enter the interior of said resonator, means coupling one of said walls to said grid electrode terminal, means coupling the other of said walls to said anode electrode terminal, a coaxial line resonator located externally of said cavity resonator and coupled to the cathode and the grid terminal of said vacuum tube, a switch and circuit elements associated therewith for conditioning said vacuum tube oscillator to function either as a transmitter oscillator or as a super-regenerative detector, a movable metallic tuning element adapted to enter the interior of said resonator for changing the resonant frequency of said cavity resonator, and means responsive to the operation of said switch for moving said tuning element.

12. In combination, a cavity resonator, a movable insert for said resonator having portions along its length of different electrical characteristics and which are adapted to be moved into the electromagnetic field of said resonator, a switch, and electromagnetic means under control of said switch for abruptly changing the extent of insertion into the electromagnetic field of said resonator of certain portions of said insert which have different electrical characteristics, to thereby abruptly change the tuning of said resonator from one value to another value.

13. In a radio apparatus adapted to operate either as a transmitter or as a receiver, an ultra high frequency oscillator common to both the transmitter and receiver and having a cavity resonator as a frequency determining element, an insert for said resonator for changing the tuning thereof, means including a switch and a relay under control of said switch for controlling said oscillator to operate either as a transmitter in one position of said switch or as a detector of signals in another position of said switch, and means under control of said relay for actuating said insert and automatically changing the tuning of said cavity resonator by a predetermined amount when the function of said oscillator is changed.

14. In combination, a cavity resonator, a movable insert for changing the resonant frequency of said cavity resonator, said insert having one portion of different electrical characteristics than another portion, both portions being adapted to be movable into the electromagnetic field of said cavity resonator between two fixed positions, and a solenoid for abruptly controlling the movement of said insert into the electromagnetic field of said cavity resonator between said fixed positions.

15. An ultra high frequency oscillator comprising a grid-controlled vacuum tube having a cathode and an anode, a tunable resonant circuit coupled between said anode and another electrode of said vacuum tube, a tunable resonant circuit coupled to said cathode, both of said resonator circuits being shielded from external influences, a loop magnetically coupled to said first resonant circuit at a low impedance location where the electric coupling is a minimum and also coupled to said cathode.

16. A high frequency oscillator circuit including a vacuum tube of the "lighthouse" type having a grid, a cathode and an anode, a tunable coaxial line resonator arranged along the axis of said tube and coupled between the cathode and grid, said coaxial line resonator being located at one end of the tube and having a hollow inner conductor surrounding the base of said tube, another tunable resonator at the other end of said tube and coupling together said grid and anode, each of said resonators having means for adjusting the resonant frequency thereof, and a feedback element coupling said resonators together and extending into one of said resonators at a location where the electric coupling is a minimum.

17. The combination with an ultra high frequency oscillator having a resonant chamber for controlling the frequency of said oscillator, and a movable insert for said chamber, of means for operating said oscillator either as a transmitter or as a detector of signals, an electromagnetic control element under control of said first means for changing the position of said insert, and adjustable means for controlling the frequency of reception independently of the frequency of transmission.

18. The combination with an ultra high frequency oscillator having a resonant chamber for controlling the frequency of said oscillator, and a movable insert for said chamber, of means for operating said oscillator either as a transmitter or as a detector of signals, an electromagnetic control element under control of said first means for changing the position of said insert, adjustable means for controlling the frequency of reception over a predetermined range, and means for adjusting the frequency of transmission to a fixed frequency within said range.

19. A transceiver including an ultra high frequency oscillator having a resonant chamber for controlling the frequency of said oscillator, a rapidly moving tuning element within said chamber, circuit elements including a switch for operating said oscillator either as a transmitter or as a detector of signals, and means under control of said switch for automatically altering the effective positions of said movable element so as to control the frequency of reception in respect to the frequency of transmission.

DE WITT R. GODDARD.
KENNETH G. MacLEAN.

REFERENCES CITED

The following references are of record in the file of this patent:

UNITED STATES PATENTS

| Number | Name | Date |
|---|---|---|
| 1,684,519 | Scheerbarth | Sept. 18, 1928 |
| 2,018,569 | Pettengill et al. | Oct. 22, 1935 |
| 2,137,435 | Yolles | Nov. 22, 1938 |
| 2,259,690 | Hansen et al. | Oct. 21, 1941 |
| 2,276,122 | Tull | Mar. 10, 1942 |
| 2,284,405 | McArthur | May 26, 1942 |
| 2,287,845 | Varian et al. | June 30, 1942 |
| 2,294,942 | Varian et al. | Sept. 8, 1942 |
| 2,297,482 | Kuhlmann | Sept. 29, 1942 |
| 2,306,282 | Samuel | Dec. 22, 1942 |
| 2,310,720 | Wandrey | Feb. 9, 1943 |
| 2,408,355 | Turner | Sept. 24, 1946 |
| 2,415,094 | Hansen et al. | Feb. 4, 1947 |
| 2,416,565 | Beggs | Feb. 25, 1947 |

FOREIGN PATENTS

| Number | Country | Date |
|---|---|---|
| 361,979 | Great Britain | Nov. 30, 1931 |
| 414,603 | Great Britain | Aug. 9, 1934 |
| 453,733 | Great Britain | Sept. 17, 1936 |
| 463,938 | Great Britain | Apr. 5, 1937 |
| 470,366 | Great Britain | Aug. 13, 1937 |
| 512,121 | Great Britain | Aug. 29, 1939 |
| 537,518 | Great Britain | June 25, 1941 |
| 550,774 | Great Britain | Jan. 25, 1943 |